US012683208B2

(12) United States Patent
Sun et al.

(10) Patent No.: US 12,683,208 B2
(45) Date of Patent: Jul. 14, 2026

(54) METHOD FOR REMOVING ELEMENTAL COPPER FROM TERNARY BATTERY WASTE AND APPLICATION THEREOF

(71) Applicants: HUNAN BRUNP RECYCLING TECHNOLOGY CO., LTD., Changsha (CN); GUANGDONG BRUNP RECYCLING TECHNOLOGY CO., LTD., Foshan (CN); HUNAN BRUNP EV RECYCLING CO., LTD., Changsha (CN)

(72) Inventors: Xie Sun, Changsha (CN); Ding Yang, Foshan (CN); Ruokui Chen, Foshan (CN); Yanchao Qiao, Foshan (CN); Xianliang Zheng, Changsha (CN); Feng Tan, Changsha (CN); Changdong Li, Foshan (CN)

(73) Assignees: HUNAN BRUNP RECYCLING TECHNOLOGY CO., LTD., Changsha (CN); GUANGDONG BRUNP RECYCLING TECHNOLOGY CO., LTD., Foshan (CN); HUNAN BRUNP EV RECYCLING CO., LTD., Changsha (CN)

( * ) Notice: Subject to any disclaimer, the term of this patent is extended or adjusted under 35 U.S.C. 154(b) by 473 days.

(21) Appl. No.: 18/215,811

(22) Filed: Jun. 28, 2023

(65) Prior Publication Data

US 2023/0344030 A1     Oct. 26, 2023

Related U.S. Application Data

(63) Continuation of application No. PCT/CN2021/123414, filed on Oct. 13, 2021.

(30) Foreign Application Priority Data

Dec. 28, 2020   (CN) .......................... 202011587284.0

(51) Int. Cl.
*H01M 10/54*      (2006.01)
*C22B 3/00*       (2006.01)
(Continued)

(52) U.S. Cl.
CPC ............. *H01M 10/54* (2013.01); *C22B 7/005* (2013.01); *C22B 7/008* (2013.01);
(Continued)

(58) Field of Classification Search
None
See application file for complete search history.

(56) References Cited

U.S. PATENT DOCUMENTS 937,293 A * 10/1909 Elliott .................... C22B 43/00
8,616,475 B1 12/2013 Smith et al.

FOREIGN PATENT DOCUMENTS

CN     101599563 A * 12/2009
CN     106558739 A * 4/2017 ............ H01M 10/54
CN     111082043 A     4/2020

OTHER PUBLICATIONS

S. Anand, P. Kanta Rao, P.K. Jena. Recovery of metal values from copper converter and smelter slags by ferric chloride leaching, 1980, Hydrometallurgy, vol. 5, Issue 4, (Year: 1980).*
(Continued)

*Primary Examiner* — Keith D. Hendricks
*Assistant Examiner* — Nikolas T Pullen
(74) *Attorney, Agent, or Firm* — Westbridge IP LLC

(57)     ABSTRACT

Disclosed are a method for removing elemental copper from ternary battery waste and its application. The method comprises the following steps: crushing and screening the ternary battery waste to obtain a powder, and then removing iron by magnetic separation to obtain an iron-removed ternary waste; Adding an alkaline solution to the iron-removed ternary waste to perform an aluminum removal
(Continued)

reaction, filtering to obtain a filter slag and aluminum-containing wastewater, washing the filter slag with water and drying to obtain a copper-nickel-cobalt-manganese material. Adding an iron salt solution to the copper-nickel-containing material to perform a leaching process, filtering to obtain a leachate and a nickel-cobalt-manganese waste; adding iron powder to the leachate and stirring to perform a reaction, filtering to obtain a copper residue, washing the copper residue with water and drying to obtain a copper-removed liquid and a sponge copper.

16 Claims, 1 Drawing Sheet

(51) Int. Cl.
    *C22B 7/00*           (2006.01)
    *C22B 15/00*         (2006.01)
    *C22B 21/00*         (2006.01)
    *C22B 47/00*         (2006.01)

(52) U.S. Cl.
    CPC ...... *C22B 15/0065* (2013.01); *C22B 15/0091* (2013.01); *C22B 21/0023* (2013.01); *C22B 23/0415* (2013.01); *C22B 47/00* (2013.01)

(56)               References Cited

OTHER PUBLICATIONS

Bokela, Filtration, Aug. 14, 2020 (Year: 2020).*

* cited by examiner

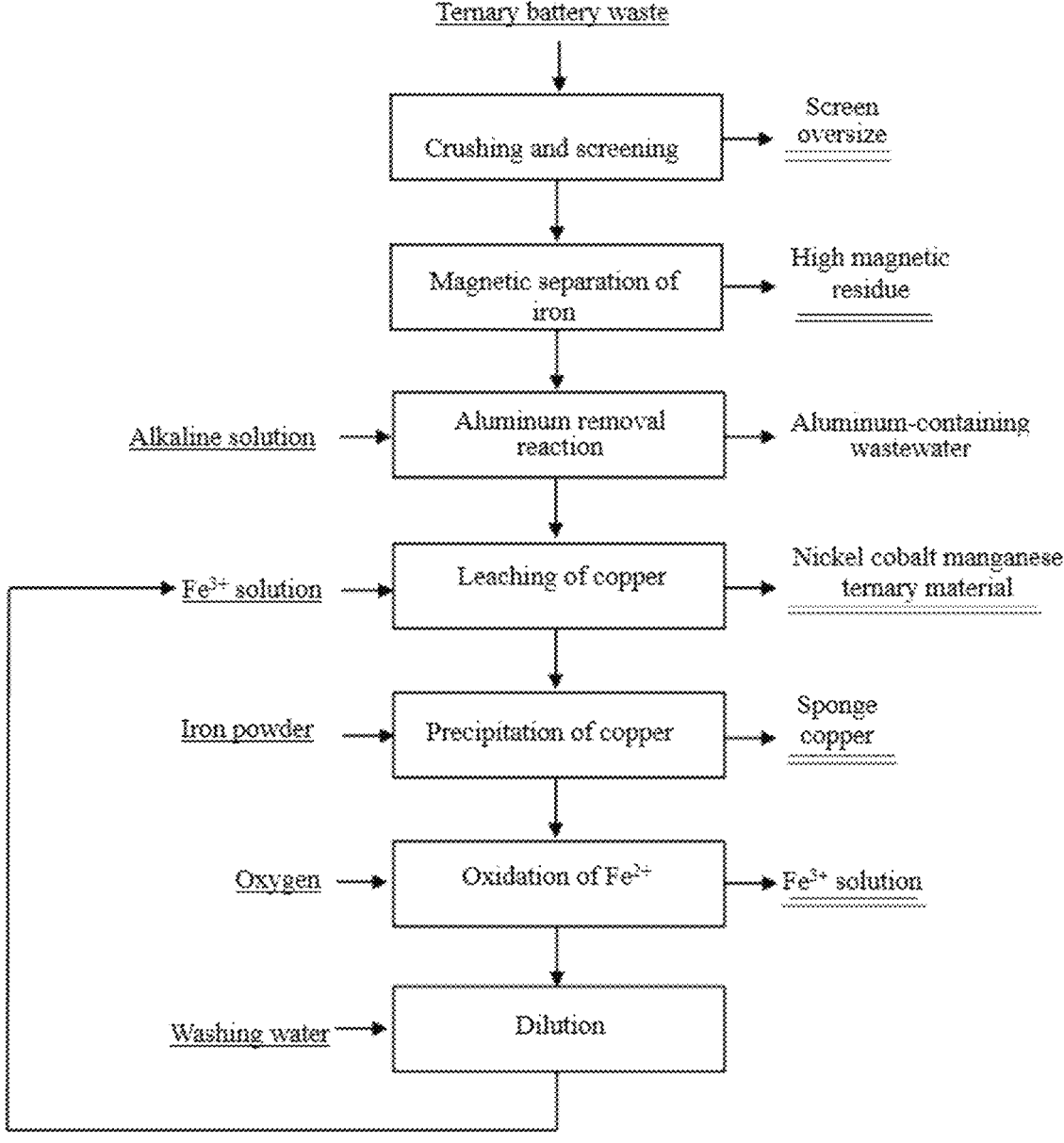

METHOD FOR REMOVING ELEMENTAL COPPER FROM TERNARY BATTERY WASTE AND APPLICATION THEREOF

CROSS-REFERENCE TO RELATED APPLICATIONS

The present application is a continuation application of PCT application No. PCT/CN2021/123414 filed on Oct. 13, 2021, which claims the benefit of Chinese Patent Application No. 202011587284.0 filed on Dec. 28, 2020. The contents of all of the aforementioned applications are incorporated by reference herein in their entirety.

TECHNICAL FIELD

The present disclosure relates to the technical field of battery waste recycling, in particular to a method for removing elemental copper from ternary battery waste and its application.

BACKGROUND

Ternary polymer lithium batteries refer to lithium batteries that use lithium nickel cobalt manganese or lithium nickel cobalt aluminum oxide ternary materials as cathode materials. Because of their advantages of comprehensive performance and cost, the materials have obtained increasing attention and recognition by the industry, and gradually surpass lithium iron phosphate and lithium manganate batteries to become mainstream. Due to the limited service life of lithium-ion batteries and the increase in their usage, the number of spent batteries is increasing day by day. Therefore, the recycling and treatment of ternary battery waste has been difficult to ignore.

The currently reported ternary battery waste recycling process is mainly divided into high temperature solid phase repair and hydrometallurgical extraction by leaching. The former obtains the ternary material after physical sorting and chemical impurity removal, and then repairs its performance by replenishing lithium and high temperature calcination. Although this method has a shorter process flow and lower cost, the product has a high impurity content, and its electrochemical performance will be affected to a certain extent.

Hydrometallurgical extraction by leaching refers to the recovery of precious metals such as nickel, cobalt and manganese by acid leaching the battery materials powder, followed by processes of impurity removal and extraction separation etc. to obtain a salt solution of nickel, cobalt and manganese, such as the currently disclosed method of recycling used lithium nickel cobalt manganate ternary cathode materials. This method directly leaches copper from the battery materials powder into a nickel-cobalt-manganese solution, and then removes the copper in the solution by replacing it with iron powder, and then removes iron and aluminum by precipitation. This method will produce a large amount of iron and aluminum slag and has difficulty to perform a filtration, which greatly affects the cost and efficiency of recycling.

SUMMARY OF THE INVENTION

The purpose of the present disclosure is to provide a method for removing elemental copper from ternary battery waste and its application. The method can remove most of copper in the ternary battery waste without causing a loss of precious metal elements such as nickel, cobalt, and manganese. The leachate of the material has reduced copper content. In a process of removing iron and aluminum, fewer chemical reagents are adopted and less slag is produced. And a sponge copper is obtained through the method. The preparation process of the invention is simple with low requirement of equipment and low energy consumption cost. The by-products are recycled, and the method is friendly to the environment.

To achieve the aforementioned objectives, the following technical solution is adopted in the present disclosure.

A method for removing elemental copper from a ternary battery waste, comprising the following steps:

(1) Crushing and screening the ternary battery waste to obtain a powder, and removing iron from the powder by magnetic separation to obtain an iron-removed ternary waste;

(2) Adding an alkaline solution to the iron-removed ternary waste to perform an aluminum removal reaction, filtering to obtain a filter slag and an aluminum-containing wastewater, washing the filter slag with water and drying to obtain a copper-containing nickel-cobalt-manganese material;

(3) Adding an iron salt solution to the copper-containing nickel-cobalt-manganese material to perform a leaching process, filtering and washing to obtain a nickel-cobalt-manganese waste and a leachate containing $Fe^{3+}$, $Fe^{2+}$, and $Cu^{2+}$;

(4) Adding iron powder to the leachate and stirring to perform a reaction, filtering to obtain a copper-removed liquid and a copper-containing filter residue, washing the filter residue with water and drying to obtain a sponge copper; the iron salt solution has a $Fe^{3+}$ concentration of 5-20 g/L.

In some embodiments, in step (1), the ternary waste is a cathode material obtained by disassembling a spent lithium nickel cobalt manganese oxide battery or a cathode material waste produced during a manufacturing process of a lithium nickel cobalt manganese oxide battery.

In some embodiments, in step (1), the magnetic separation is performed at a magnetic field strength of 60-120 T. Magnetic separation of iron is a physical removal of iron, which adopts reduced amount of chemical reagents, such as alkaline solutions.

In some embodiments, in step (2), the alkaline solution is an alkaline earth metal oxide solution. In some other embodiments, the alkaline earth metal oxide solution is at least one selected from the group consisting of sodium hydroxide solution and potassium hydroxide solution.

In some embodiments, in step (2), the alkaline solution has a mass percentage of 15-35%.

In some embodiments, in step (2), the molar ratio of an alkali in the alkaline solution to the aluminum in the iron-removed ternary waste is (1.2-1.5):1.

In some embodiments, in step (2), the liquid-to-solid ratio of the alkaline solution and the iron-removed ternary waste is 3-5 mL/g. In some embodiments, the liquid-to-solid ratio of the alkaline solution and the iron-removed ternary waste is 4 mL/g;

In some embodiments, in step (2), the aluminum removal reaction is carried out at a temperature of 80° C.-100° C. In some embodiments, the aluminum removal reaction is carried out at a temperature of 85° C.-95° C. At 80° C.-100° C., under a circumstance of excessive alkali, most of the aluminum will be converted into meta-aluminate entering into the solution which does not contain metals of nickel, cobalt, manganese or copper.

In some embodiments, in step (2), the aluminum removal reaction is carried out for 0.5-5 h. In some other embodiments, the aluminum removal reaction is carried out for 1-2 h.

In some embodiments, in step (2), the water and the filter slag are in a volume-to-mass ratio 5-20 mL/g. In some other embodiments, the water and the filter slag are in a volume-to-mass ratio 10 mL/g.

In some embodiments, in step (2), the drying is carried out at a temperature of 80° C.-150° C. for 6-12 h.

In some embodiments, in step (3), the molar ratio of $Fe^{3+}$ in the iron salt solution to copper in the copper-nickel-cobalt-manganese material is (1-5):1.

In some other embodiments, in step (3), the molar ratio of $Fe^{3+}$ in the iron salt solution to copper in the copper-nickel-cobalt-manganese material is 3:1.

In some embodiments, in step (3), the iron salt solution (aqueous solution of ferric ion) is at least one selected from the group consisting of iron chloride, iron sulfate and iron nitrate. 20 g/L.

In some embodiments, in step (3), the iron salt solution has an iron concentration of 5-20 g/L.

More In some embodiments, in step (3), the iron salt solution has an iron concentration of 10-20 g/L.

In some embodiments, in step (3), the leaching process is performed at a temperature of 10° C.-60° C. for 2-6 h.

In some embodiments, the step (3) further includes steps of subjecting the nickel-cobalt-manganese waste to acid leaching, impurities removal, extraction and separation to obtain a nickel-cobalt-manganese salt solution, and then recovering the nickel, cobalt and manganese from the solution.

In some embodiments, in step (4), the iron powder has a size of 60-120 mesh. In some other embodiments the iron powder has a size of 90-100 mesh.

In some embodiments, the molar ratio of the iron powder in the step (4) to the iron ions in the iron salt solution in the step (3) is (0.5~0.8):1; when the iron ions concentration of the iron salt solution is too low, the leaching of the copper is incomplete; when the iron ions concentration of the iron salt solution is too high, a part of the nickel, cobalt and manganese in the waste will be leached out, resulting in a loss of valuable metals. And the amount of iron powder required for the subsequent reduction process will increase, resulting in a decrease of the sponge copper purity. Therefore, the molar ratio is more preferred (0.6-0.7):1.

In some embodiments, in step (4), the drying is carried out at a temperature of 80° C.-150° C. for 6-12 h.

In some embodiments, step (4) further comprises the steps of adding an oxidizing agent to the copper-removed liquid to perform an oxidation reaction and obtain a solution containing ferric ions, then diluting the solution with water and returning the diluted solution to step (3) to continue the copper removal.

In some other embodiments, the oxidizing agent is at least one selected from the group consisting of oxygen, ozone, and chlorine.

In some embodiments, the oxidizing agent is introduced at a rate of 10-50 L/h. In some other embodiments, the oxidizing agent is introduced at a rate of is 20-25 L/h.

In some embodiments, the oxidation reaction is performed for 3-12 h. In some other embodiments, the oxidation reaction is performed for 6-8 h.

The present disclosure also provides the application of the above-mentioned method in battery recycling.

Advantages of the Present Disclosure

1. The method of the present disclosure can remove most of the copper in the ternary waste without causing a loss of the precious metal elements such as nickel, cobalt, manganese, etc. The leaching solution of the ternary material has reduced copper content. In a process of removing iron and aluminum, fewer chemical reagents are adopted and less slag are produced. And sponge copper is obtained though the method. The preparation process of the disclosure is simple with low requirement of equipment and low energy consumption cost. The by-products are recycled, and the method is friendly to the environment.

2. In the present disclosure, after subjecting the ternary waste to processes of crushing, screening and iron and aluminum removing, a 5-20 g/L iron salt solution (aqueous solution of ferric ion) is used to leach copper in the ternary material to obtain a leachate containing copper. The leachate is reacted with iron powder to obtain a sponge copper and an aqueous solution of ferrous ions. The aqueous solution of ferrous ions is oxidized into an aqueous solution of ferric ions and returned to continue leaching copper in the ternary material. By this way, firstly, a waste of iron powder can be reduced, and the iron does not react with the iron salt solution; secondly, after the primary steps of iron and aluminum removing, there will not be large amount of iron and aluminum slag produced, which facilitates a press filtration process, reduces the recovery cost and improves the recovery efficiency. The mechanism of the method is as follows:

$$2Fe^{3+} + Cu = 2Fe^{2+} + Cu^{2+}, Fe + Cu^{2+} = Fe^{2+} + Cu,$$

$$Fe + 2Fe^{3+} = 3Fe^{2+}, 4Fe^{2+} + O_2 + 4H^+ = 4Fe^{3+} + 2H_2O.$$

BRIEF DESCRIPTION OF DRAWINGS

The above and/or additional aspects and advantages of the present disclosure will become obvious and easy to understand from the description of the embodiments in conjunction with the following drawings, in which:

FIG. 1 is a process flow diagram of Example 1 of the present disclosure.

DETAILED DESCRIPTION OF THE ILLUSTRATED EXAMPLES

In order to fully understand the present disclosure, the preferred experimental scheme of the present disclosure will be described below in conjunction with examples to further illustrate the characteristics and advantages of the present disclosure. Any change or alteration that does not deviate from the gist of the present disclosure can be understood by those skilled in the art. The scope of protection of the disclosure is determined by the scope of the claims.

Example 1

The method for removing elemental copper from a ternary battery waste of this embodiment comprises the following steps:

(1) Crushing 500 g ternary battery waste obtained by dissembling used lithium nickel-cobalt-manganese oxide batteries and screening with a 100-mesh screen to obtain 408 g powder (undersize); placing the powder in a magnetic plate at a magnetic field strength of 60 T to perform a magnetic separation of iron for 30 min, to obtain 335 g aluminum-containing lithium nickel-cobalt-manganese oxide material.

(2) Adding 1000 mL of 30% (mass fraction) sodium hydroxide solution to the aluminum-containing lithium nickel-cobalt-manganese oxide material and stirring at 90° C. for 1.5 h, filtering to obtain a filter slag, washing the filter slag and drying to obtain 296 g aluminum-removed nickel-cobalt-manganese material. It is tested that in the material, the copper is in a fractional mass content of 2.08%, the nickel is in a fractional mass content of 25.61%, the cobalt is in a fractional mass content of 5.33% and the manganese is in a fractional mass content of 5.12%.

(3) Adding 0.7 L ferric chloride solution having an iron content of 10 g/L to the nickel-cobalt-manganese material containing 2.08% copper and stirring at 50° C. for 3 h, filtering to obtain 590 mL leachate and a filter residue. The leachate was tested to have a copper content of 2.93 g/L, a nickel content of 19.2 mg/L, a cobalt content of 10.4 mg/L, and a manganese content of 4.5 mg/L. Washing the filter residue and drying to obtain a residue with a copper content of 0.22%, a nickel content of 25.55%, a cobalt content of 5.36%, and a manganese content of 5.08%.

(4) Adding 3.5 g iron powder with a size of 100 mesh to the 590 mL leachate and stirring at room temperature for 2 h, filtering to obtain 570 mL copper-removed liquid and a filter residue. The copper-removed liquid was tested to have a copper content of 58.7 mg/L. Washing the filter residue and drying to obtain 2.1 g copper residue (sponge copper), which was tested to have a copper content of 85.1%.

(5) Introducing oxygen into the copper-removed liquid at a flow rate of 40 L/h and stirring at room temperature for 4 h to obtain 570 mL solution containing ferric ions (the iron content of the solution meets the requirement of the copper leaching process in step (3), which can be returned to step (3) to perform the copper-removed reaction). The solution was tested to have an ferric ion content of 18.9 g/L.

FIG. 1 is a process flow diagram of Example 1 of the present disclosure. After subjecting the ternary battery waste to crushing, screening, iron and aluminum removing, an ferric ions aqueous solution is used to leach copper from the ternary battery waste. And the copper leachate was reacted with the iron powder to obtain sponge copper and a ferrous ions solution, which is oxidized to a ferric ions aqueous solution to continue leaching copper in the ternary battery waste.

TABLE 1

| | Copper | Nickel | Cobalt | Manganese | Iron |
|---|---|---|---|---|---|
| Copper leachate | 2.93 g/L | 19.2 mg/L | 10.4 mg/L | 4.5 mg/L | 10.1 g/L |
| Nickel-cobalt-Manganese waste | 0.22% | 25.55% | 5.36% | 5.08% | 0.04% |
| Copper-removed liquid | 58.7 mg/L | 14.4 mg/L | 9.4 mg/L | 4.3 mg/L | 19.0 g/L |
| Copper residue (sponge copper) | 85.1% | 0.17% | 0.05% | 0.1% | 11.5% |
| Solution containing ferric ions | 44 mg/L | 10.2 mg/L | 8.8 mg/L | 4.1 mg/L | 18.9 g/L |

Element contents of the substances obtained in Example 1

From Table 1, the content of copper in sponge copper is 85.1%, which is greater than 40% and can be sold directly as a product, the contents of nickel, cobalt and manganese in the copper leachate are relatively low, and the nickel, cobalt and manganese are basically not leached. The ferric ions content in the copper-removed liquid is 19.0 g/L, which meets the requirement of step (3) for copper leaching, and can be reused in step (3) to continue the copper-removal reaction.

Example 2

The method for removing elemental copper from a ternary battery waste of this embodiment comprises the following steps:

(1) Crushing 1000 g ternary battery waste obtained by dissembling used lithium nickel-cobalt-manganese oxide batteries and screening with a 100-mesh screen to obtain 820 g powder (undersize); placing the powder in a magnetic plate at a magnetic field strength of 60 T to perform a magnetic separation of iron for 30 min, to obtain 733 g aluminum-containing lithium nickel-cobalt-manganese oxide material.

(2) Adding 2000 mL of 30% (mass fraction) sodium hydroxide solution to the aluminum-containing lithium nickel-cobalt-manganese oxide material and stirring at 90° C. for 1.5 h, filtering to obtain a filter slag, washing the filter slag and drying to obtain 500 g aluminum-removed nickel-cobalt-manganese material. It is tested that in the material, the copper is in a fractional mass content of 1.88%, the nickel is in a fractional mass content of 20.69%, the cobalt is in a fractional mass content of 5.33% and the manganese is in a fractional mass content of 5.09%.

(3) Adding 0.5 L ferric sulfate solution having an iron content of 20 g/L to 100 g nickel-cobalt-manganese material containing 1.88% copper and stirring at 30° C. for 3 h, filtering to obtain 380 mL leachate and a filter residue. The leachate was tested to have a copper content of 3.5 g/L, a nickel content of 30.1 mg/L, a cobalt content of 15.4 mg/L, and a manganese content of 10.1 mg/L. Washing the filter residue and drying to obtain a residue with a copper content of 0.34%, a nickel content of 20.65%, a cobalt content of 5.22%, and a manganese content of 5.01%.

(4) Adding 6 g iron powder with a size of 80 mesh to the 380 mL leachate and stirring at room temperature for 2 h, filtering to obtain 375 mL copper-removed liquid and a filter residue. The copper-removed liquid was tested to have a copper content of 65.4 mg/L. Washing the filter residue and drying to obtain 5.1 g copper residue, which was tested to have a copper content of 73.1%.

(5) Introducing oxygen into the copper-removed liquid at a flow rate of 26 L/h and stirring at room temperature for 4 h to obtain 375 mL solution containing ferric ions (the ferric ions content of the solution meets the requirement of the copper leaching process in step (3), which can be returned to step (3) to continue the copper removal). The solution was tested to have a ferric ion content of 29.9 g/L.

TABLE 2

| | Copper | Nickel | Cobalt | Manganese | Iron |
|---|---|---|---|---|---|
| Copper leachate | 3.5 g/L | 30.1 mg/L | 15.4 mg/L | 10.1 mg/L | 9.9 g/L |
| Nickel-cobalt-Manganese waste | 0.34% | 20.65% | 5.22% | 5.01% | 0.05% |
| Copper-removed liquid | 65.4 mg/L | 26.4 mg/L | 14.2 mg/L | 10.0 mg/L | 30.5 g/L |

Elements contents of the substances obtained in Example 2

TABLE 2-continued

| | Copper | Nickel | Cobalt | Manganese | Iron |
|---|---|---|---|---|---|
| Copper residue (sponge copper) | 73.1% | 0.15% | 0.03% | 0.12% | 19.5% |
| Solution containing ferric ions | 60.3 m/L | 20.1 mg/L | 9.9 mg/L | 9.3 mg/L | 29.9 g/L |

Elements contents of the substances obtained in Example 2

As illustrated in Table 2, the copper content in the sponge copper is 73.1%, which is greater than 40% and can be sold directly as a product. The contents of nickel, cobalt and manganese in the copper leachate are relatively low, and the nickel, cobalt and manganese are basically not leached. The iron (III) ions solution has an iron content of 29.9 g/L, which can be diluted to meet the requirement of step (3) for copper leaching, and can be reused in step (3) to continue the copper-removal reaction.

Example 3

The method for removing elemental copper from a ternary battery waste of this embodiment comprises the following steps:

(1) Crushing 250 g ternary battery waste obtained by dissembling used lithium nickel-cobalt-manganese oxide batteries and screening with a 100-mesh screen to obtain 208 g powder (undersize); placing the powder in a magnetic plate at a magnetic field strength of 60 T to perform a magnetic separation of iron for 30 min, to obtain 187 g aluminum-containing lithium nickel-cobalt-manganese oxide material.

(2) Adding 250 mL of 30% (mass fraction) sodium hydroxide solution to the aluminum-containing lithium nickel-cobalt-manganese oxide material and stirring at 90° C. for 1.5 h, filtering to obtain a filter slag, washing the filter slag and drying to obtain 126 g aluminum-removed nickel-cobalt-manganese material. It is tested that in the material, the copper is in a fractional mass content of 2.28%, the nickel is in a fractional mass content of 23.63%, the cobalt is in a fractional mass content of 4.73% and the manganese is in a fractional mass content of 4.54%.

(3) Adding 1.5 L ferric nitrate solution having an iron content of 10 g/L to 100 g nickel-cobalt-manganese material containing 2.28% copper and stirring at 40° C. for 2 h, filtering to obtain 1.38 L leachate and a filter residue. The leachate was tested to have a copper content of 1.57 g/L, a nickel content of 5.8 mg/L, a cobalt content of 3.4 mg/L, and a manganese content of 4.1 mg/L. Washing the filter residue and drying to obtain 100.3 g residue with a copper content of 0.29%, a nickel content of 23.55%, a cobalt content of 4.76%, and a manganese content of 4.48%.

(4) Adding 17 g iron powder with a size of 60 mesh to the 1380 mL leachate and stirring at room temperature for 2 h, filtering to obtain 1370 mL copper-removed liquid and a filter residue. The copper-removed liquid was tested to have a copper content of 66.3 mg/L. Washing the filter residue and drying to obtain 5.1 g copper residue, which was tested to have a copper content of 82.3%.

(5) Introducing ozone into the 1370 mL copper-removed liquid at a flow rate of 18 L/h and stirring at room temperature for 3 h to obtain 1396 mL solution containing ferric ions (the ferric ion content of the solution meets the requirement of the copper leaching process in step (3), which can be returned to step (3) to continue the copper removal). The solution was tested to have a ferric ion content of 20.2 g/L.

TABLE 3

| | Copper | Nickel | Cobalt | Manganese | Iron |
|---|---|---|---|---|---|
| Copper leachate | 1.57 g/L | 5.8 mg/L | 3.4 mg/L | 4.1 mg/L | 10.1 g/L |
| Nickel-cobalt-Manganese waste | 0.29% | 23.55% | 4.76% | 4.48% | 0.06% |
| Copper-removed liquid | 66.3 mg/L | 1.9 mg/L | 5.8 mg/L | 3.4 mg/L | 21.1 mg/L |
| Copper residue (sponge copper) | 82.3% | 0.15% | 0.04% | 0.11% | 8.1% |
| Solution containing ferric ions | 44.1 mg/L | 1.8 mg/L | 3.1 mg/L | 4.0 mg/L | 20.2 g/L |

Elements contents of the substances obtained in Example 3

As illustrated in Table 3, the copper content in the sponge copper is 82.3%, which can be sold directly as a product. The contents of nickel, cobalt and manganese in the copper leachate are relatively low, and the nickel, cobalt and manganese are basically not leached. The solution containing ferric ions has an iron content of 20.2 g/L, which can be diluted to meet the requirement of step (3) for copper leaching, and can be reused in step (3) to continue the copper removal.

Comparative Example 1 (Iron Content of 25 g/L)

The method for removing elemental copper from a ternary battery waste of this embodiment comprises the following steps:

(1) Crushing 250 g ternary battery waste obtained by dissembling used lithium nickel-cobalt-manganese oxide batteries and screening with a 100-mesh screen to obtain 200 g powder (undersize); placing the powder in a magnetic plate at a magnetic field strength of 60 T to perform a magnetic separation of iron for 30 min, to obtain 167 g aluminum-containing lithium nickel-cobalt-manganese oxide material.

(2) Adding 250 mL of 30% (mass fraction) sodium hydroxide solution to the aluminum-containing lithium nickel-cobalt-manganese oxide material and stirring at 90° C. for 1.5 h, filtering to obtain a filter slag, washing the filter slag and drying to obtain 106 g aluminum-removed nickel-cobalt-manganese material. It is tested that in the material, the copper is in a fractional mass content of 2.28%, the nickel is in a fractional mass content of 23.63%, the cobalt is in a fractional mass content of 4.73% and the manganese is in a fractional mass content of 4.54%.

(3) Adding 1.5 L ferric nitrate solution having an iron content of 25 g/L to 100 g nickel-cobalt-manganese material containing 2.28% copper and stirring at 25° C. for 2 h, filtering to obtain 1.48 L leachate and a filter residue. The leachate was tested to have a copper content of 1.47 g/L, a nickel content of 28.8 mg/L, a cobalt content of 10.4 mg/L, and a manganese content of 24.1 mg/L. Washing the filter residue and drying to obtain 100.3 g residue with a copper content of 0.09%, a nickel content of 24.55%, a cobalt content of 4.46%, and a manganese content of 5.48%.

(4) Adding 28 g iron powder with a size of 60 mesh to the 1480 mL leachate and stirring at room temperature for 2 h, filtering to obtain 1420 mL copper-removed liquid and a filter residue. The copper-removed liquid was tested to have a copper content of 66.3 mg/L. Washing the filter residue and drying to obtain 7.4 g copper residue, which was tested to have a copper content of 31.3%.

(5) Introducing ozone into the 1480 mL copper-removed liquid at a flow rate of 18 L/h and stirring at room temperature for 3 h to obtain 1450 mL solution containing ferric ions (the ferric ion content of the solution meets the requirement of the copper leaching process in step (3), which can be returned to step (3) to continue the copper removal). The solution was tested to have an iron ion content of 37.2 g/L.

TABLE 4

Elements contents of the substances obtained in Comparative Example 1

| | Copper | Nickel | Cobalt | Manganese | Iron |
|---|---|---|---|---|---|
| Copper leachate | 1.58 g/L | 755.5 mg/L | 233.1 mg/L | 510.1 mg/L | 24.9 g/L |
| Nickel-cobalt-Manganese waste | 0.29% | 24.55% | 4.46% | 5.48% | 0.01% |
| Copper-removed liquid | 58.7 mg/L | 725.5 mg/L | 230.1 mg/L | 500.1 mg/L | 39.9 g/L |
| Filter residue (sponge copper) | 31.1% | 0.25% | 0.09% | 0.13% | 66.2% |
| Solution containing ferric ions | 53.7 mg/L | 713.5 mg/L | 200.1 mg/L | 479.1 mg/L | 39.2 g/L |

As illustrated in Table 4, the copper content in the sponge copper of Comparative Example 1 is 31.1%, which includes large amount of unreacted iron powder. The contents of nickel, cobalt and manganese in the copper leachate are high, and a part of the nickel, cobalt and manganese are leached to the ferric chloride solution. The solution containing ferric ions has an iron content of 39.2 g/L, which can be diluted to meet the requirement of step (3) for copper leaching, and can be reused in step (3) to continue the copper-removal.

The method for removing elemental copper from a ternary battery waste and application thereof provided by the present disclosure are described in detail above. Specific examples are used in this article to illustrate the principle and implementation of the present disclosure. The description of the above examples is only used to help understand the method and core idea of the present disclosure, including the best mode, and also enables any person skilled in the art to practice the present disclosure, including manufacturing and using any device or system, and implementing any combined method. It should be pointed out that for those of ordinary skill in the art, without departing from the principle of the present disclosure, several improvements and modifications can be made to the present disclosure, and these improvements and modifications also fall within the protection scope of the claims of the present disclosure. The scope of patent protection of the present disclosure is defined by the claims, and may include other embodiments that those skilled in the art can think of. If these other embodiments have structural elements that are not different from the literal expression of the claims, or if they include equivalent structural elements that are not substantially different from the literal expression of the claims, these other embodiments should also be included in the scope of the claims.

The invention claimed is:

1. A method for removing elemental copper from a ternary battery waste comprising the following steps:
   (1) crushing and screening the ternary battery waste to obtain a powder, and removing iron from the powder by magnetic separation to obtain an iron-removed ternary waste;
   (2) adding an alkaline solution to the iron-removed ternary waste to perform an aluminum removal reaction, filtering to obtain a filter slag and an aluminum-containing wastewater, washing the filter slag with water and drying to obtain a copper-containing nickel-cobalt-manganese material;
   (3) adding an iron salt solution to the copper-containing nickel-cobalt-manganese material to perform a leaching process, filtering to obtain a filter residue and a leachate containing $Fe^{3+}$, $Fe^{2+}$, and $Cu^{2+}$, washing the filter residue to obtain a nickel-cobalt-manganese waste;
   4) adding iron powder to the leachate and stirring to perform a reaction, filtering to obtain a copper-removed liquid and a copper residue, washing the copper residue with water and drying to obtain a sponge copper; the iron salt solution has a $Fe^{3+}$ concentration of 5-20 g/L;
   wherein in step (2), an alkali in the alkaline solution and aluminum in the iron-removed ternary waste are in a molar ratio of (1.2-1.5):1; and the aluminum removal reaction is carried out at a temperature of 80° C.-100° C.;
   and wherein step (3) further comprises steps of subjecting the nickel-cobalt-manganese waste to acid leaching, impurity removal, extraction and separation to obtain a nickel-cobalt-manganese salt solution, and then recovering nickel, cobalt and manganese.

2. The method according to claim 1, wherein in step (1), the ternary battery waste is a cathode material obtained by disassembling a spent lithium nickel cobalt manganate battery or a cathode material waste produced during a manufacturing process of a lithium nickel cobalt manganate battery.

3. A method for recycling of ternary battery waste, comprising using the method of claim 2.

4. The method according to claim 1, wherein in step (2), the alkaline solution is an alkaline earth metal hydroxide solution; the alkaline earth metal hydroxide solution is at least one selected from the group consisting of sodium hydroxide solution and potassium hydroxide solution.

5. A method for recycling of ternary battery waste, comprising using the method of claim 4.

6. The method according to claim 1, wherein the iron powder in step (4) and iron ions in the iron salt solution in step (3) are in a molar ratio of (0.5-0.8):1; and wherein the iron powder has a size of 60-120 mesh.

7. A method for recycling of ternary battery waste, comprising using the method of claim 6.

8. The method according to claim 1, wherein in step (2), the aluminum removal reaction is carried out for 0.5-5 h; and wherein in step (3), the iron salt solution is at least one selected from the group consisting of iron chloride solution, iron sulfate solution, and iron nitrate solution.

9. A method for recycling of ternary battery waste, comprising using the method of claim 8.

10. The method according to claim 1, wherein in step (3), the leaching process is performed at a temperature of 10° C.-30° C. for 2-6 h.

11. A method for recycling of ternary battery waste, comprising using the method of claim 10.

12. The method according to claim 1, wherein step (4) further comprises steps of adding an oxidizing agent to the copper-removed liquid to perform an oxidation reaction and obtain a solution comprising ferric ions, diluting the solution with water to obtain a diluted solution, and returning the diluted solution to step (3) to continue copper removal.

13. The method according to claim 12, wherein the oxidizing agent is at least one selected from the group consisting of oxygen, ozone, and chlorine; wherein the oxidizing agent is introduced at a rate of 10-50 L/h; the oxidation reaction is carried out for 3-12 h.

14. A method for recycling of ternary battery waste, comprising using the method of claim 13.

15. A method for recycling of ternary battery waste, comprising using the method of claim 12.

16. A method for recycling of ternary battery waste, comprising using the method of claim 1.

\* \* \* \* \*